United States Patent [19]

Hori

[11] Patent Number: 4,918,480

[45] Date of Patent: Apr. 17, 1990

[54] ELECTROMAGNETIC SHUTTER FOR CAMERA

[75] Inventor: Masakatsu Hori, Tokyo, Japan

[73] Assignee: Asahi Kogaku Kogyo Kabushiki Kaisha, Tokyo, Japan

[21] Appl. No.: 263,419

[22] Filed: Oct. 27, 1988

[30] Foreign Application Priority Data

Oct. 30, 1987 [JP] Japan .................. 62-275401

[51] Int. Cl.⁴ .................................. G03B 3/00
[52] U.S. Cl. ........................... 354/400; 354/435; 354/195.1
[58] Field of Search ............ 354/400, 402, 403, 195.1, 354/195.11, 195.12, 435

[56] References Cited

U.S. PATENT DOCUMENTS

| | | | |
|---|---|---|---|
| 4,295,715 | 10/1981 | Breen | 354/400 |
| 4,360,258 | 11/1982 | Hashimoto | 354/435 |
| 4,634,254 | 1/1987 | Ogihara et al. | |
| 4,695,144 | 9/1987 | Yoshino et al. | |
| 4,696,559 | 9/1987 | Kondo | 354/403 |
| 4,779,114 | 10/1988 | Kobayashi | 354/400 |
| 4,799,077 | 1/1989 | Kaplan et al. | 354/400 |

FOREIGN PATENT DOCUMENTS

| | | |
|---|---|---|
| 61-9631 | 1/1986 | Japan . |
| 61-9632 | 1/1986 | Japan . |
| 62-47014 | 2/1987 | Japan . |
| 62-47015 | 2/1987 | Japan . |
| 62-127530 | 8/1987 | Japan . |
| 62-127531 | 8/1987 | Japan . |

*Primary Examiner*—Russell E. Adams
*Attorney, Agent, or Firm*—Sandler & Greenblum

[57] ABSTRACT

An electromagnetic shutter of a camera in which a lens is moved to a focal position by a rotation of a single reversible motor in one direction and the exposure control is effected by the reverse rotation of the same motor in the opposite direction, including a first rotating member which is continuously associated with the rotation of the reversible motor in the forward and reverse directions, a second rotating member which comes into contact with the first rotating member at a specific rotational position to rotate together when first rotating member rotates in the forward direction, a focus adjusting lens barrel which moves in the optical axis direction in association with the rotation of the second rotating member, a lens shutter which is supported by the second rotating member and which is opened and closed by the relative rotation of the first rotating member with respect to the second rotating member, a one-way clutch which allows the second rotating member to rotate only in one direction from its initial position into its terminal end position, and a device for releasing the one-way clutch means when the second rotating member reaches its terminal end position.

20 Claims, 4 Drawing Sheets

ELECTROMAGNETIC SHUTTER FOR CAMERA

BACKGROUND OF THE INVENTION

1. Field of the Invention

The present invention relates to an electromagnetically driven shutter in an automatic focus and exposure camera, and more particularly it relates to an electromagnetically driven camera in which the focus adjustment and the exposure control can be effected by a single reversible motor.

2. Description of Related Art

In a known automatic focusing and automatic exposure control type of camera in which automatic focusing and automatic exposure control can be successively effected in association with a releasing operation, a lens is moved to a focal position and a lens shutter is driven by the tensile force of such a spring which is opened during a releasing operation. In a known mechanism, it is necessary not only to store spring force but also to provide a reduction gear, such as a governor, resulting in a complex construction and a larger operational force. To solve this, an electromagnetically driven shutter has been developed, in which both the focus adjustment and the exposure control are carried out by a single reversible motor, as disclosed, for example, in Japanese Unexamined Patent Publication Nos. 61-9631 and 61-9632. However, in a conventional electromagnetically driven shutter, it is necessary to provide a clutching electromagnet in order to maintain the lens at a predetermined position. Furthermore, there is a drawback in that there is a large time lag before the commencement of exposure control after the lens is held at the focal position.

SUMMARY OF THE INVENTION

The primary object of the present invention is therefore, to provide an electromagnetically driven shutter in which the focus adjustment and the exposure control can be effected by a single reversible motor, which has no clutching electromagnet for holding the lens in a predetermined position, and which can decrease the time lag between the completion of the time that the lens is held in a predetermined position and the commencement of exposure control.

To achieve the objects mentioned above, according to the present invention, an electromagnetic shutter of a camera is provided in which a lens is moved to a focal position by rotation of a single reversible motor in one direction and exposure control is effected by the reversing rotation of the same motor in the opposite direction, comprising a first rotating member which is continuously associated with the rotation of the reversible motor in the forward and reverse directions, a second rotating member which comes into contact with the first rotating member at a specific rotational position in order to rotate together when the first rotating member rotates in the forward direction, a focus adjusting lens barrel which moves in the optical axis direction in association with the rotation of the second rotating member, a lens shutter which is supported by the second rotating member and which is opened and closed by the relative rotation of the first rotating member with respect to the second rotating member, one-way clutch means which allows the second rotating member to rotate only in one direction from its initial position into its terminal end position and which prevents rotation of the second rotating member in the opposite direction, and means for releasing the one-way clutch means when the second rotating member reaches it terminal position thereof.

With this arrangement, the focus adjustment and the exposure control can be performed by controlling the direction of rotation and the displacement of rotation of the reversible motor in accordance with signals from an object distance measuring device and a photometer, without the provision of a clutching electromagnet. Furthermore, the time period (time lag) in which the exposure control is commenced after the lens is moved to a focal position can be remarkably decreased.

BRIEF DESCRIPTION OF DRAWINGS

The invention will be described below in detail with reference to the accompanying drawings, in which.

DETAILED DESCRIPTION OF THE EMBODIMENTS

Figure 1:
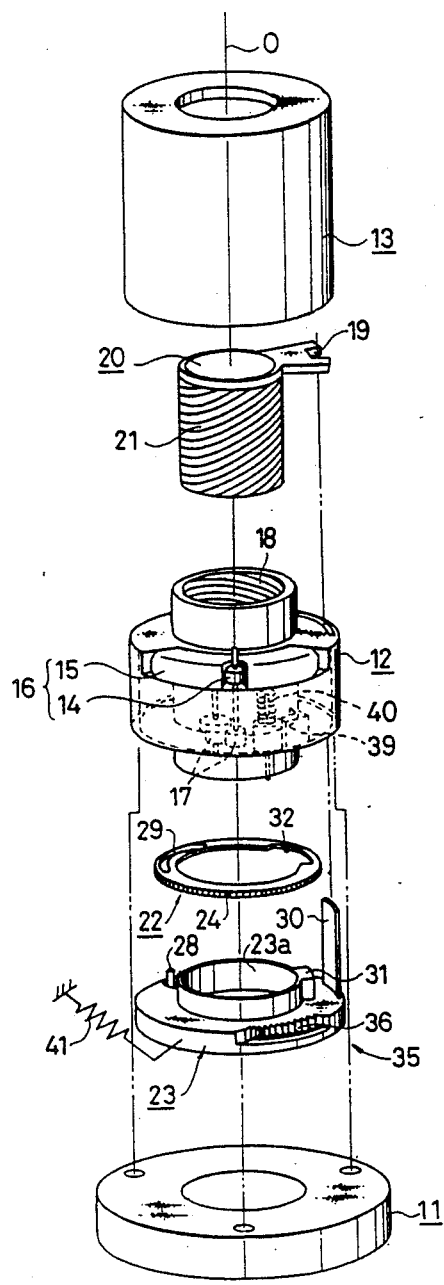
FIG. 1 is an exploded perspective view of an embodiment of an electromagnetic shutter according to the present invention.

In FIG. 1, which is an exploded perspective view of an electromagnetic shutter according to the present invention, the optical axis of a photographing lens system is designated at O. Stationary members of the electromagnetic shutter of the present invention are annular base 11, drive mechanism holding block 12, and decoration frame 13. These elements are connected to each other. In the drive mechanism holding block 12 are incorporated a stepping motor 16 which has a rotor 14 and a stator coil 15. A reduction gear train 17 is located below the rotor 14. The drive mechanism holding block 12 is provided, on its center portion, with a female threaded portion (nut member) 18 in which a focus adjusting lens barrel 20, having male threaded portion 21 on its outer periphery, is screwed. The lens barrel 20, which holds a focus adjusting lens (not shown), rotates to move in the optical axis direction in accordance with the engagement of the male and female threaded portions 18 and 21 in order to carry out the focusing operation. The lens barrel 20 has a radially projecting abutment arm 19.

Between the annular base 11 and the drive mechanism holding block 12 annular first and second rotating members 22 and 23 are supported which are rotatable about the optical axis O. The first rotating member 22 is provided on its outer periphery with a gear 24 which meshes with the terminal gear of the reduction gear train 17, so that when the stepping motor 16 rotates in opposite directions, the first rotating member 22 rotates in opposite directions corresponding to the forward and reverse directions of rotation of the stepping motor 16.

Figure 5:
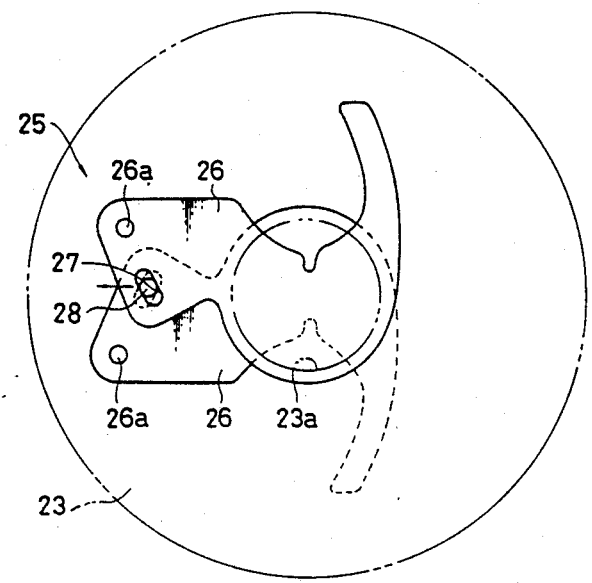
FIG. 5 is a front elevational view of an opening and closing mechanism of shutter sectors, by way of an example.
Figure 6:
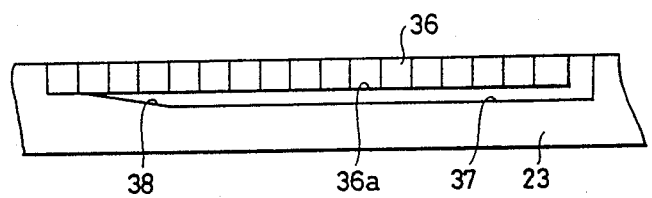
FIG. 6 is a developed side view of an engaging mechanism between first and second rotating members; and, FIG. 7 is an exploded perspective view of a serrated portion and an engaged claw of a therein, off one-clutch.
Figure 7:
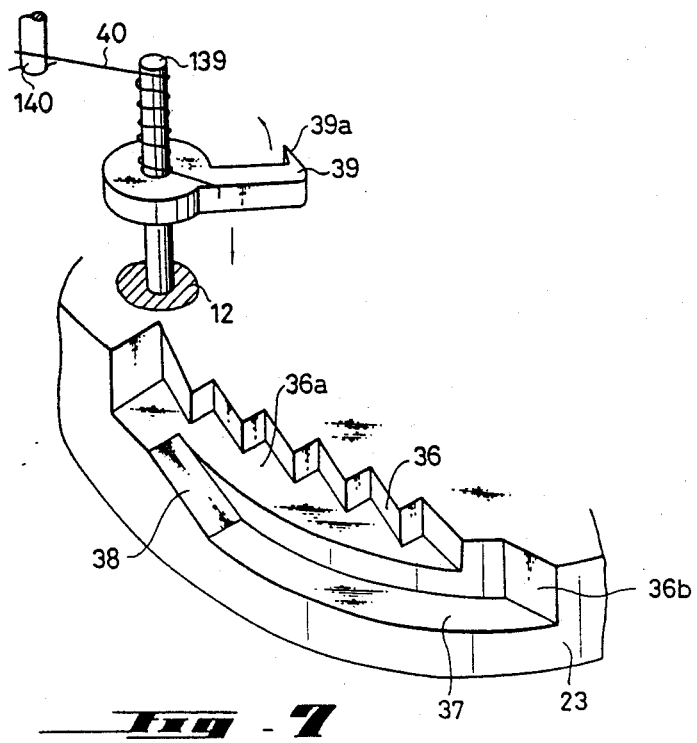

The second rotating member 23 has therein a lens shutter 25 which is shown in FIG. 5, by way of an example. The lens shutter 25 has a pair of shutter sectors 26 which are rotatable about respective shafts 26 as to open and close shutter aperture 23a. The shutter sectors 26 have opening and closing openings 27 which are overlapped. A single opening and closing pin 28 which movably supports the second rotating member 23, is fitted in the opening and closing openings 27, so that when the opening and closing pin 28 move in the directions shown at arrows in FIG. 5, the shutter sectors 26 rotate in opposite directions to come away from and approach each other so as to open and close the shutter aperture 23a. The degree of opening of the shutter aperture 23a can be controlled by the displacement of the opening and closing pin 28. Only the opening and closing pin 28 is shown, and the elements of the lens shutter 25 are not shown in FIG. 1 and FIGS. 2A~2C. The opening and closing pin 28 is fitted in a cam groove 29 which is provided on the first rotating member 22.

The second rotating member 23 has an association lever 30 which extends parallel to with the optical axis O and which is fitted in the abutment arm 19 of the lens barrel 20, so that the second rotating member 23 and the lens barrel 20 rotate equally together.

The second rotating member 23 has an associated projection 31 which is engaged by the first rotating member 22. The associated projection is located in an elongated recess 32 formed on the first rotating member 22, so that the relative rotation can taken place between the first rotating member 22 and the second rotating member 23, within the range of the elongated recess. Namely, the first and second rotating members 22 and 23 can rotate relative to each other between two end positions in which the associated projection 31 comes into contact with opposite ends of the elongated recess 32. In other words, the first and second rotating members 22 and 23 rotate together when the associated projection 31 comes into contact with one of the opposite ends of elongated recess 32. The rotational position fo the second rotating member 23 is restricted by a one-way clutch 35. The one-way clutch 35 is composed of a serrated portion 36 on the outer periphery of the second rotating member 23, a non-engaging flat surface 37 which is located radially outward from and below, the serrated portion 36, and an engagement returning oblique surface 38 which is tapered from the terminal end of the non-engaging flat surface 37 towards the serrated portion 36, as can be seen from FIGS. 3A to 3D and FIGS. 6 and 7. The one-way clutch 35 also has a claw 39 which is pivoted to the drive mechanism holding block 12 (or between the drive mechanism holding block 12 and the annular base 11) so as to mesh with the teeth of the serrated portion 36. Namely, the claw 39 is rotatably supported on a shaft 139 which is provided on the drive mechanism holding block 12 and is normally located on a flat surface 36a which lies on a plane flush with the bottom of the teeth of the serrated portion 36, so that a hook portion 39a formed, on the front end of the claw 39, is engaged by the teeth of the serrated portion 36. The claw 39 is continuously biased by a tension coil spring 40 connected to a pin 140 provided on the drive mechanism holding block 12, so that the claw 39 (hook portion 39a) is brought into engagement with the serrated portion 36. Namely, the claw 39 is subject to a rotational force about the shaft 139 due to the spring 40. The tension spring 40 also biases the claw 39 downwardly so that the claw 39 tends to move onto the non-engaging flat surface 37 from the serrated portion 36, when the claw 39 is disengaged from the serrated portion 36. The claw 39 and the serrated portion 36 are shaped so that the second rotating member 23 can rotate only in a direction from its initial position toward a terminal embodiment) but can not rotate in the opposite direction (i.e., a lens feeding-in direction in the illustrated embodiment), when they are engaged with each other. The second rotating member 23 is continuously biased to rotate in the lens feeding-in direction by a tension spring 41 provided on the annular base 11.

The electromagnetic (electromagnetically driven) shutter constructed above operates as follows.

Figure 2A:
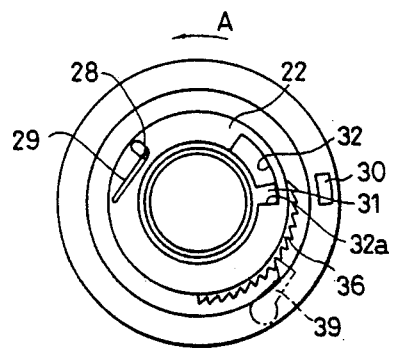
FIGS. 2A, 2B and 2C are sectional views of an electromagnetic shutter shown in different operational positions.
Figure 3A:
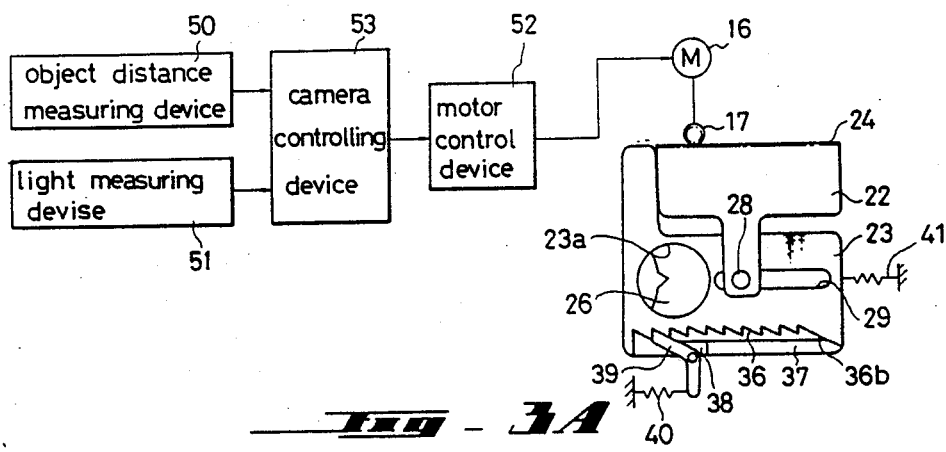
FIGS. 3A, 3B, 3C and 3D are schematic views of developed rotating members which come into engagement with each other, shown in different operational positions.

In the initial position, the electromagnetic shutter is located in an extremity position in which the second rotating member 23 is rotated by a maximum angular displacement in the clockwise direction by the tension spring 41, as shown ion FIGS. 2A and 3A, so that the lens is brought into the farthest fed-in position by the lens barrel 20, which rotates equally together with the second rotating member 23. The first rotating member 22 which is engaged by the second rotating member, through the associated projection 31 of the second rotating member 23 and the elongated recess 32 of the first rotating member 22, is located at a maximum angular displacement in the clockwise direction in FIGS. 1 and 2A, in which one end 32a (FIG. 2A) of the elongated recess 32 comes into contact with the associated projection 31, so that the shutter sectors 26 of the lens shutter 25 close the shutter opening 23a thereof.

Figure 2B:
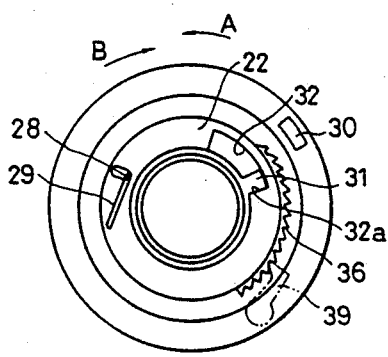
Figure 3B:
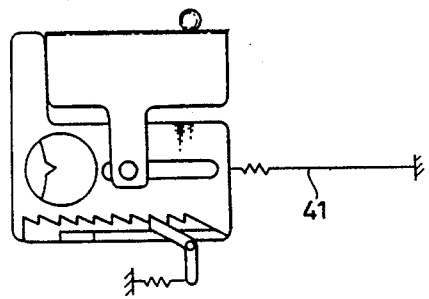
Figure 4:
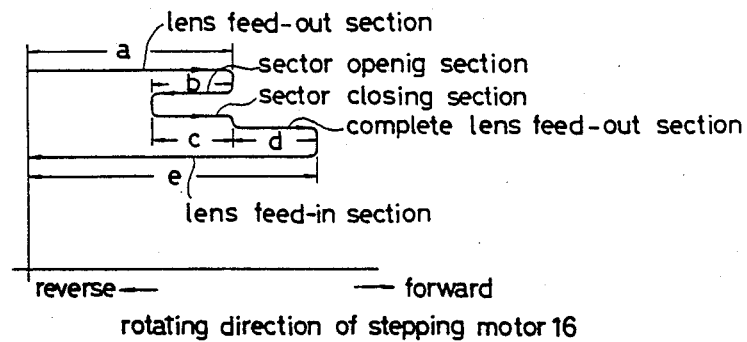
FIG. 4 is a time chart showing the relationship between directions of rotation of a stepping motor and strokes of an electrically driven shutter.

In the initial position mentioned above, when the object distance measuring device 50 which is actuated in association with the shutter button (not shown) and the motor control circuit 52 (FIG. 3A) gives a predetermined number of pulses, corresponding to the object distance, to the stepping motor 16 to rotate the stepping motor in the forward direction, the first rotating member 22 is rotated in the counterclockwise direction shown by arrow A in FIGS. 2A and 2B (forward direction) through the reduction gear train 17 and the gear 24. As a result, end 32a of the elongated recess 32 pushes the associated projection 31 to rotate the second rotating member 23 in the same direction, so that the lens barrel 20, which rotates equally together with the second rotating member 23, with the help of the engagement between associated lever 30 and the abutment arm 19, rotates in the same direction to feed the lens outwardly (FIGS. 2B, 3B, and second a in FIG. 4). In the lens feed-out section a, claw 39 of the one-way clutch, 35 rides on the teeth of the serrated portion 36, one-by-one, in accordance with rotation of the second rotating member 23. When the second rotating member 23 stops rotating, the second rotating member 23 is locked by the engagement of the claw in the associated tooth of the serrated portion 36. In the lens feed-out section a, since no relative rotation between the first rotating member 22 and the second rotating member 23 take place, the opening and closing pin 28 does not move, so that the shutter sectors 26 maintain the shutter opening 23a in the closed position. The focus adjustment is thus completed.

Figure 2C:
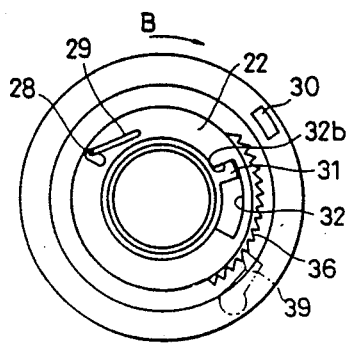
Figure 3C:
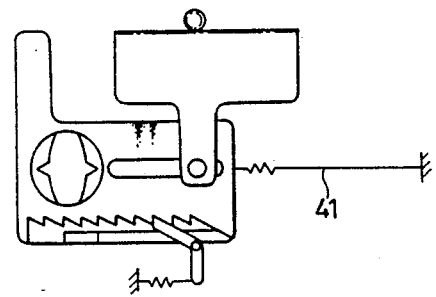

When the focus adjustment is completed, that is, when the stepping motor 16 rotates over a predetermined angular displacement corresponding to the number of pulses needed for focus adjustment, the stepping motor 16 stops rotating, and then a predetermined number of pulses corresponding to the detection signal of the photometer (light measuring device) 51 (FIG. 3A) for detecting the light of the object is supplied to the stepping motor 16 through a camera control device 53 and motor control circuit 52 to reverse the stepping motor. As a result, the first rotating member 22 rotates in the clockwise direction (reverse direction), shown by arrow B (FIGS. 2C and 3C). During the rotation of the first rotating member 22 in the clockwise direction, the associated projection 31 of the first rotating member 22 moves in the elongated recess 32, so that the first rotating member idles with respect to the second rotating member 23. Namely, since the first rotating member 22 rotates relative to the second rotating member 23, the opening and closing pin 28 of the second rotating member 23, which is fitted in the cam groove 29 of the first rotating member 22, moves in the radial direction to open the shutter sectors 26. The value of the opening angle of the shutter opening 23a with respect to the angular displacement of the shutter sectors 26 can be controlled by the number of revolutions (i.e the angular displacement) of the stepping motor i.e., the number of pulses of reverse rotation of the stepping motor 16 (sector opening section b in FIG. 4).

When the shutter opening 23a reaches a desired diaphragm value, the stepping motor 16 stops, and, thereafter, it immediately rotates in the forward direction. As a result, the relative rotation between the first and second rotating members 22 and 23 takes place in a direction opposite to that of the sector opening section b in FIG. 4, so that the opening and closing pin 28 moves in the opposite direction. This causes the shutter sectors 26 to close the shutter opening 23a (sector closing section c in FIG. 4). The sector opening and closing sections b and c correspond to the exposure control section. In this exposure control section, the claw 39 of the one-way clutch 35 and the serrated portion 36 are brought into engagement with each other, so that the second rotating member 23 (and the lens barrel 20) are maintained in a position which they reach in the lens feed-out section a, as mentioned above.

Figure 3D:
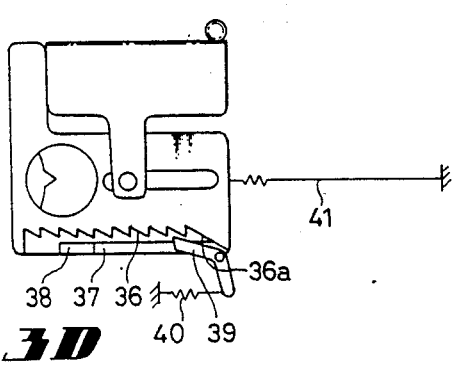

Further forward rotation of the stepping motor 16 causes the other end 32b (FIG. 2C) of the elongated recess 32 of the first rotating member 22 to come into abutment with the associated projection 31 of the second rotating member 23, so that the latter beings rotating in the direction B together with the first rotating member 22. Accordingly, the lens barrel 20 continues rotating in the lens feed-out direction. When the lens reaches the maximum feed-out position, the claw 39 comes into abutment with the end tooth 36b of the serrated portion 36 (i.e., the complete lens feed-out section d). Consequently, the claw 39, which is biased towards the non-engagement flat surface 37 by the tension spring 40, is disengaged from the serrated portion 36 so as to come into engagement with the non-engaging flat surface 37 (FIG. 3D). As a result, the second rotating member 23, which is biased to rotate in the lens feed-in direction by the tension spring 41, is rapidly rotated to the maximum feed-in position (i.e. lens feed-in section e). At the terminal end of the movement of the second rotating member 23 towards the maximum feed-in position, the claw 39 is again brought into engagement with the serrated portion 36 by the engagement returning oblique surface 38. Namely, the claw 39 is returned to the initial position shown in FIGS. 2A and 3A. Since the second rotating member 23 always rotates equally together with the lens barrel 20, the rotation of the second rotating member 23 causes the lens to move to the maximum lens feed-in position (initial position).

Although the reversible motor comprises of a stepping motor in the above-mentioned embodiment, it is not limited thereto.

Furthermore, although the lens barrel 20 is normally maintained in the lens feed-in position and is fed out in response to the focus signal in the above-mentioned embodiment, it is also possible to feed-in the lens barrel 20, which is normally maintained in a feed-out position, in response to the focus signal.

In the illustrated embodiment, the focus adjusting lens is moved in the optical axis direction by the helicoid. Alternatively, it is also possible to provide a cam mechanism which is actuated by the rotational movement of the rotating member(s) to move the focus adjusting lens.

As can be understood from the foregoing, in the electromagnetically driven shutter according to the present invention, since no clutching electromagnet for holding the lens in a desired position is necessary, there are fewer of components, resulting in an expensive and simple construction of an electromagnetic shutter.

Furthermore, according to the present invention, since the control can be directly switched from the focus control to the exposure control by only reversing the reversible motor, the shutter can be quickly actuated, substantially without a time lag. This prevents a so-called out-of focus status which would otherwise occur when the object accidentally moves during the time lag, resulting in a clear picture of the object.

I claim:

1. An electromagnetic shutter of a camera in which a lens is moved to a focal position by rotation of a single reversible motor in one direction, and in which exposure control is effected by reverse rotation of said motor in an opposed direction, said shutter comprising a first rotating member which is continuously associated with rotation of the reversible motor in forward and reverse directions, a second rotating member which contacts the first rotating member at a specific rotational position so as to rotate together when the first member rotates in the forward direction, a focus adjusting lens barrel which moves in an optical axis direction in association with rotation of the second rotating member, a lens shutter which is supported by the second rotating member and which is opened and closed by relative rotation of the first rotating member with respect to the second rotating member, one-way clutch means which allows the second rotating member to rotate only in one direction, from its initial position into a terminal end position, and which prevents rotation of the second rotating member in an opposite direction, and means for releasing the one-way clutch means when the second rotating member reaches the terminal and position.

2. An electromagnetic shutter of a camera according to claim 1, wherein said first rotating member has a circumferential recess and wherein said second rotating member has an associated projection which is located in the circumferential recess.

3. An electromagnetic shutter of a camera according to claim 2, wherein said circumferential recess is an elongated recess having two circumferential ends.

4. An electromagnetic shutter of a camera according to claim 3, wherein said first rotating member is adapted to rotate relative to the second rotating member, within a predetermined range which is defined by the length of the elongated recess of the first rotating member.

5. An electromagnetic shutter of a camera according to claim 1, further comprising a drive mechanism holding block which holds the reversible motor for driving the first rotating member.

6. An electromagnetic shutter of a camera according to claim 5, wherein said focus adjusting lens barrel is screw-engaged by the drive mechanism holding block.

7. An electromagnetic shutter of a camera according to claim 6, wherein said focus adjusting lens barrel has a radial abutment arm and wherein said second rotating member has an associated lever which is associated with the radial abutment arm of the focus adjusting lens barrel to equally rotate said radial abutment arm together with the second rotating member, and which extends parallel to the optical axis of the focus adjusting lens barrel.

8. An electromagnetic shutter of a camera according to claim 7, wherein said first rotating members is in the form of an annular plate.

9. An electromagnetic shutter of a camera according to claim 8, wherein said first rotating member is provided, on its outer periphery, with a peripheral gear.

10. An electromagnetic shutter of a camera according to claim 9, further comprising a reduction gear train which is held by the drive mechanism holding block and which is connected to the reversible motor to be driven thereby, so that the peripheral gear of the first rotating member meshes with the end gear of the reduction gear train.

11. An electromagnetic shutter of a camera according to claim 1, wherein said lens shutter comprises shutter sectors which can be closed and opened.

12. An electromagnetic shutter of a camera according to claim 11, wherein said shutter sectors are pivoted to the second rotating member so as to open and close.

13. An electromagnetic shutter of a camera according to claim 11, further comprising a displaceable opening and closing pin for actuating the shutter sectors.

14. An electromagnetic shutter of a camera according to claim 13, wherein the opening of the lens shutter is defined by the displacement of the opening and closing pin.

15. An electromagnetic shutter of a camera according to claim 13, wherein said first rotating member has a cam groove in which the opening and closing pin is fitted to define the displacement of the opening and closing pin in accordance with the angular displacement of the relative rotation of the first rotating member and the second rotating member.

16. An electromagnetic shutter of a camera according to claim 1, further comprising an object distance measuring device for detecting an object distance and a photometer for detecting the light of the object.

17. An electromagnetic shutter of a camera according to claim 16, wherein said motor is angularly displaceable in opposed direction, wherein angular displacements of the reversible motor in the opposite directions are determined in accordance with detection signals from the object distance measuring device and the photometer.

18. An electromagnetic shutter of a camera according to claim 1, further comprising means for biasing the second rotating member towards an initial position of the second rotating member.

19. An electromagnetic shutter of a camera according to claim 18, wherein said biasing means comprises a tension spring.

20. An electromagnetic shutter of a camera in which a lens is moved to a focal position by rotation of a single reversible motor in one direction, and in which exposure control is effected by reverse rotation of the same motor in an opposite direction, said shutter comprising a first rotating member which is continuously associated with rotation of the reversible motor in forward and reverse direction, a second rotating member which discontinuously engages the first rotating member at an idling section in which the first rotating member idles with respect to the second rotating member, said second rotating member being adapted to rotate together with the first rotating member from the idling section, a focus adjusting lens barrel which is adapted to move in the optical axis direction integrally in association with rotation of the second rotating member, a lens shutter which is supported by the second rotating member and which is opened and closed by the relative rotation of the first rotating member with respect to the second rotating member, one-way clutch means which allows the second rotating member to rotate in one direction between an initial position into a terminal end position and which prevents the rotation of the second rotating member ion the opposite direction, and means for releasing the one-way clutch means when the second rotating member reaches the terminal end position of said second rotating member to return the second rotating member to the initial position, said first rotating member being positioned so that when the reversible motor rotates in one direction at the initial position, the first rotating member will immediately rotate the second rotating member integrally with said first rotating member without traversing the idling section.

* * * * *

UNITED STATES PATENT AND TRADEMARK OFFICE
CERTIFICATE OF CORRECTION

PATENT NO. : 4,918,480

DATED : April 17, 1990

INVENTOR(S) : M. HORI

It is certified that error appears in the above-identified patent and that said Letters Patent is hereby corrected as shown below:

On the Title page:

In the Abstract, line 3, change "and the" to ---, in which---.

In the Abstract, line 21, delete "means".

below the last line of the Abstract, change "4 Drawing Sheets" to ---5 Drawing Sheets---.

Column 1, line 14, before "in" insert ---,---.
line 19, after "In" insert ---such---.
line 26, change "disclosed ," to ---disclosed,---.
line 37, before "therefore" insert ---,---.
line 50, before "and" insert ---,---.
line 67, before "and" insert ---,---.

Column 2, line 2, change "it" to ---its---.
line 37, delete "therein, off".
line 37, change "one-" to ---one-way---.
line 60, change "18 and 21" to ---21 and 18---.

Column 3, line 8, change "26 as" to ---26a---.
line 11, before "which" insert ---,---.
line 14, change "move" ---moves---.
line 15, change "at" to ---by---.
line 25, change "association" to ---associated---.
line 26, delete "with".
line 34, change "taken" to ---take---.
line 44, change "fo" to ---of---.
line 49, before "and" insert ---,---.
line 63, change "formed," to ---, formed---.

Column 4, line 10, after "terminal" insert ---position (i.e., a lens feeding-out direction in the illustrated---.
line 22, change "ion" to ---in---.
line 52, change "second" to ---section---.

UNITED STATES PATENT AND TRADEMARK OFFICE
CERTIFICATE OF CORRECTION

Page 2 of 2

PATENT NO. : 4,918,480
DATED : April 17, 1990
INVENTOR(S) : M. HORI

It is certified that error appears in the above-identified patent and that said Letters Patent is hereby corrected as shown below:

```
            line 54, after "clutch" delete ",".
            line 62, change "take" to ---takes---.
    Column 5, line 56, change "non-engagement" to ---non-
engaging---.
            line 62, after "i.e." insert ---,---.
    Column 6, line 5, delete "of".
            line 24, delete "of".
            line 31, change "out-of focus" to ---out-
of-focus---.
    In claim 1, line 23, change "and" to ---end---.
    In claim 8, line 2, change "members" to ---member---.
    In claim 20, line 24, change "ion" to ---in---.
```

Signed and Sealed this

Twenty-seventh Day of April, 1993

*Attest:*

MICHAEL K. KIRK

*Attesting Officer*  *Acting Commissioner of Patents and Trademarks*